June 3, 1952  R. MACULAN  2,599,268

METHOD OF PRODUCING HOLLOW CERAMIC BODIES

Filed Jan. 25, 1949

INVENTOR:
Rudolf Maculan
by Sommers & Young
Attorneys

Patented June 3, 1952

2,599,268

UNITED STATES PATENT OFFICE 2,599,268

METHOD OF PRODUCING HOLLOW CERAMIC BODIES

Rudolf Maculan, Vienna, Austria, assignor to Baumat A. G., Zurich, Switzerland

Application January 25, 1949, Serial No. 72,718
In Austria January 31, 1948

6 Claims. (Cl. 25—156)

My present invention relates to hollow bodies particularly for use as fillers or aggregate in building materials and to a method of producing such hollow bodies.

The object of my invention is to provide such hollow bodies which are light in weight and yet of great strength so as to be suitable for use in the preparation of such materials as light-weight concrete. Another object is to provide a simple method of manufacturing such hollow bodies.

According to my invention the steps are performed comprising, extruding at least one tubular body of plastic ceramic material, mechanically compressing the walls of the emerged tubular body while still in a plastic state at equal distances to form solid portions, said solid portions defining in the tubular body enclosed and rounded hollow sections of uniform structure, separating said hollow sections at said solid portions to obtain hollow sections of substantially spherical shape, drying and baking said hollow sections to form hollow bodies having a uniform resistance to pressure throughout their surface.

My invention further comprises a hollow ball-like body made by the foregoing method.

In order to enable the invention to be readily carried into effect, a few embodiments thereof will hereinafter be described by way of example and with reference to the accompanying drawings. In said drawings.

Figure 1:
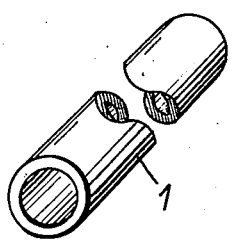
Fig. 1 is a perspective view of a single tube of ceramic material as extruded during the first step of operation according to my method, part of said tube being broken away.
Figure 2:
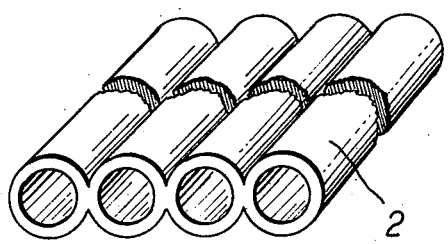
Fig. 2 is a similar view of a number of associated parallel ceramic tubes obtained through a common extruding operation.

In the embodiment according to Fig. 1, a single tube 1 of ceramic material, such as clay or loam, is made by extruding the material through correspondingly shaped nozzles. This is the first step in one manner of carrying the method into effect. As an alternative to this step and as shown in Fig. 2, a tube unit 2 consisting of several juxtaposed parallel tubes can be similarly produced, instead of the single tube according to Fig. 1. As a further variant of this first step and according to Fig. 3, the plastic ceramic material can be extruded in the shape of corrugated plates, and two of such plates 3 and 4 can be united along the troughs of the corrugations to form a similar tube unit as in Fig. 2.

Figure 4:
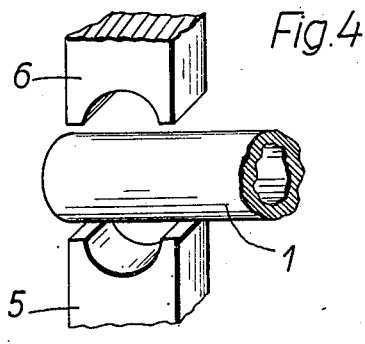
Fig. 4 is a diagrammatic perspective view of a press adapted to engage opposite sides of a tubular ceramic member with a view to the formation of spherical members in same.

Using a tube made as described with reference to Fig. 1, the next step according to Fig. 4 consists of squeezing together, whilst still in its plastic condition, the tube 1 as spaced localised places. This is done by means of stamping tools 5, 6 which are adapted to be vertically reciprocated and which simultaneously cut the tube at these places. The severed short lengths of tubing, having closed ends, constitute hollow bodies 7 of approximately spherical shape, for example as shown in Fig. 5 and are seamless and of a uniform structure throughout.

These hollow bodies are thereupon subjected to a preliminary drying operation and are then burnt. After being moulded during the preliminary drying stage and partly also during the firing process, they are, if necessary, subjected to a treatment of their surface whereby any existing surface irregularities are removed. This may be done, for example, by causing the bodies to grind against each other in rotating containers so that the hollow bodies obtain a substantially spherical shape and a smooth outer surface. As the hollow spherical bodies referred to are obtained through the deformation under pressure of the tubes when still in their plastic state, it is possible to obtain a perfectly intimate connection between the wall elements of the hollow body without any seam or weak spot appearing. Consequently the resistance to pressure of the hollow body when baked is practically the same in all directions. The conditions governing this resistance against pressure is selected obviously in order to satisfy the requirements of application to be considered.

Figure 3:
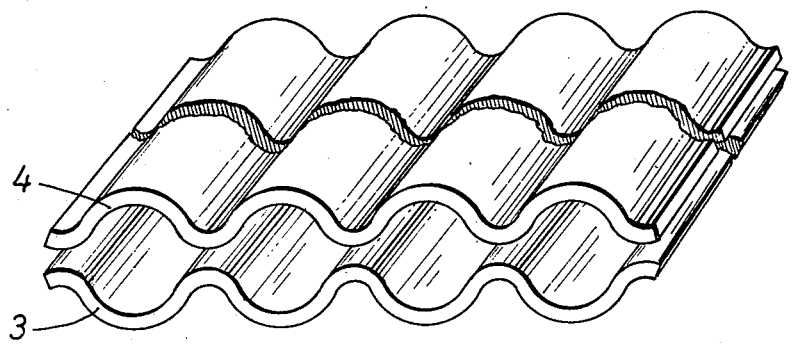
Fig. 3 is a perspective view of two superposed corrugated plates adapted when united to form a system of parallel tubes similar to that illustrated in Fig. 2.
Figure 5:

In like manner, it is possible by means of suitable stamping tools to produce, from the tubular bodies shown in Figs. 2 and 3, hollow bodies similar to Fig. 5 which by similar treatment are afterwards given the ball-like shape characteristic of this invention.

Instead of producing the hollow bodies by means of vertically reciprocating stamping tools, they can be made from the tubular bodies by rollers having annular or hemispherical recesses or by similarly recessed chains or bands which are guided on rollers.

The plastic ceramic material may have combustible materials added to it, such as coal, charcoal, etc. which are burnt during the firing process so that the hollow ball-like bodies become porous.

Furthermore, the material of the ball-like bodies may contain chemical substances which, when the balls are used as coarse aggregate for concrete, are caused by the action of the added water to give off gases whereby the concrete disposed between the balls is made additionally porous.

I claim:

1. The method for producing hollow ceramic bodies of substantially spherical shape for use as a coarse aggregate in concrete masses, comprising the steps of extruding a tubular body of plastic ceramic material, mechanically compressing the walls of the emerged tubular body while still in a plastic state, at equal distances to form solid portions, said solid portions defining in the tubular body enclosed and rounded hollow sections of uniform structure, separating said hollow sections at said solid portions to obtain hollow sections of substantially spherical shape, drying and baking said hollow sections to form hollow bodies having a uniform resistance to pressure throughout their surface.

2. The method for producing hollow ceramic bodies of substantially spherical shape, suitable for use as fillers and aggregates in concrete masses, comprising the steps of extruding a tubular body including a system of parallel tubes in adjacent relationship and forming a uniform structure of raw ceramic material, mechanically compressing the walls of the emerged tubular body while still in a plastic state, at equal distances to form solid portions, said solid portions defining in the tubular body enclosed and rounded hollow sections of uniform structure, separating said hollow sections at said solid portions to obtain hollow sections of substantially spherical shape, drying and baking said hollow sections to form hollow bodies having a uniform resistance to pressure throughout their surface.

3. The method for producing hollow ceramic bodies of substantially spherical shape, particularly for use as fillers and aggregates in concrete masses, comprising extruding a cylindrical tubular body of plastic ceramic material, mechanically compressing the walls of the emerged tubular body while still in a plastic state, at regular intervals to form solid portions, said solid portions defining in said tubular body enclosed and rounded hollow sections of uniform structure, separating said hollow sections at said solid portions, said compressing and separating being performed by the simultaneous movement of forming tools towards the tubular body to obtain hollow sections of substantially spherical shape, surface-treating said hollow sections to remove surface irregularities, drying and baking said hollow sections to form hollow bodies having a uniform resistance to pressure throughout their surface.

4. The method for producing hollow ceramic bodies of substantially spherical shape, suitable for use as fillers and aggregates inside concrete masses, comprising extruding a cylindrical tubular body of plastic ceramic material, mechanically compressing the walls of the emerged tubular body while still in a plastic state, at regular intervals to form solid portions, said solid portions defining in the interior of said tubular body rounded hollow sections of uniform structure, separating said hollow sections at said solid portions, said compressing and separating being performed through the action of recessed rollers urged against the tubular body, surface-treating said hollow sections to remove surface irregularities, drying and baking said hollow sections to form hollow bodies having a uniform resistance to pressure throughout their surface.

5. The method for producing hollow ceramic bodies of substantially spherical shape for use as a coarse aggregate in concrete masses, comprising the steps of incorporating combustible material in plastic ceramic material, extruding a tubular body of plastic ceramic material, mechanically compressing the walls of the emerged tubular body while still in a plastic state, at equal distances to form solid portions, said solid portions defining in the tubular body enclosed and rounded hollow sections of uniform structure, separating said hollow sections at said solid portions to obtain hollow sections of substantially spherical shape, drying and baking said hollow sections to form hollow bodies having a uniform resistance to pressure throughout their surface.

6. The method for producing hollow ceramic bodies of substantially spherical shape for use as a coarse aggregate in concrete masses, comprising the steps of incorporating in plastic ceramic material chemical substances adapted to evolve gases when subjected to the action of water, extruding a tubular body of said plastic ceramic material, mechanically compressing the walls of the emerged tubular body while still in a plastic state, at equal distances to form solid portions, said solid portions defining in the tubular body enclosed and rounded hollow sections of uniform structure, separating said hollow sections at said solid portions to obtain hollow sections of substantially spherical shape, drying and baking said hollow sections to form hollow bodies having a uniform resistance to pressure throughout their surface.

RUDOLF MACULAN.

REFERENCES CITED

The following references are of record in the file of this patent:

UNITED STATES PATENTS

| Number | Name | Date |
|---|---|---|
| 868,762 | Crow | Oct. 22, 1907 |
| 874,167 | Crow | Dec. 17, 1907 |
| 1,106,087 | Du Pont et al. | Dec. 4, 1914 |
| 1,411,170 | Karh | Mar. 28, 1922 |
| 1,507,219 | Treitel | Sept. 2, 1924 |
| 1,751,430 | Thomson | Mar. 18, 1930 |
| 2,046,071 | Harding | June 30, 1936 |
| 2,136,096 | Benner et al. | Nov. 28, 1938 |
| 2,187,432 | Powers | Jan. 16, 1940 |